United States Patent [19]

Memering et al.

[11] 4,349,642

[45] Sep. 14, 1982

[54] ULTRAVIOLET RADIATION AND IMPACT RESISTANT THERMOPLASTIC BLENDS

[75] Inventors: Leroy J. Memering; Ervin G. Pritchett, both of Cincinnati, Ohio

[73] Assignee: National Distillers & Chemical Corp., New York, N.Y.

[21] Appl. No.: 259,887

[22] Filed: May 4, 1981

[51] Int. Cl.$^3$ ............................................. C08K 3/22
[52] U.S. Cl. ................................... 524/524; 524/535; 524/536
[58] Field of Search ...................... 260/45.75 F, 42.46; 524/524, 535, 536

[56] References Cited

U.S. PATENT DOCUMENTS 3,907,656  9/1975  Souza ............................ 204/159.14
4,141,936  2/1979  Pritchett ............................. 525/57
4,175,071  11/1979  Chen et al. .................... 260/42.75 F Primary Examiner—J. Ziegler
Attorney, Agent, or Firm—Kenneth D. Tremain

[57] ABSTRACT

Ultraviolet radiation and impact resistant thermoplastic blends are provided which comprise:
(a) a polymer triblend comprising:
  i. from about 5 parts per hundred (pph) to about 40 pph of at least one resin selected from the group consisting of a copolymer of ethylene and vinyl acetate containing from about 25 percent to about 75 percent vinyl acetate and a terpolymer of ethylene, vinyl acetate and the theoretical monomer vinyl alcohol containing from about 20 percent to about 80 percent ethylene, from about 18 percent to about 60 percent vinyl acetate and from about 2 percent to about 20 percent vinyl alcohol;
  ii. from about 50 pph to about 95 pph of a copolymer of styrene and acrylonitrile containing from about 15 percent to about 40 percent acrylonitrile;
  iii. from about 0.1 pph to about 40 pph of a chlorine-containing polymer such as chlorinated polyethylene or polyvinylchloride; and
(b) from about 2 to about 40 pph titania particulate.

26 Claims, No Drawings

ULTRAVIOLET RADIATION AND IMPACT RESISTANT THERMOPLASTIC BLENDS

BACKGROUND OF THE INVENTION

This invention relates to the field of polymer blends or alloys containing ethylene-vinyl acetate (EVA) copolymer and/or ethylene-vinyl acetate-vinyl alcohol (E-VA-VOH) terpolymer as impact strength modifier for brittle styrene-acrylonitrile copolymer.

It is well known that relatively few polymerpolymer blends have useful properties due to their incompatibility. Even useful polymer blends, such as those of nitrile rubber in styrene-acrylonitrile (SAN) copolymer to increase impact strength, have been greatly improved by substituting rubber-SAN graft copolymers for the nitrile rubber to provide superior impact resistance. These well known compositions are now generally referred to as the ABS (acrylonitrile-butadiene-styrene) resins.

Techniques other than that of graft polymerization have been employed for introducing compatibility in polymer blends, or alloys. Thus, for example, as described in U.S. Pat. No. 3,906,057, a block copolymer which combines blocks of two homopolymers in a single macromolecule will compatibilize a blend of the homopolymers when added in amounts of about 5-40 weight parts per hundred parts of blend. Similarly, U.S. Pat. No. 3,485,777 describes the compatibilization of polymer blends by the addition of a graft copolymer having molecular segments of solubility characteristics similar to the solubility characteristics of the blended component polymers. Variations of these compatibilization techniques include coupling polymer components in situ with coupling agents as described in U.S. Pat. No. 3,645,939

These methods of obtaining compatibilization in polymer blends are of limited usefulness since they each depend upon some special additive and extensive working or a chemical reaction to achieve the result desired. Accordingly, attempts have been made in the past to obtain compatibilized polymer blends by merely blending the component polymers using simple known and conventional procedures. A number of polymer alloys containing EVA copolymer or E-VA-VOH terpolymer and one or more other polymers are known. U.S. Pat. No. 3,283,035 describes a polymer blend of polyvinyl chloride (PVC) containing at least 80 weight percent vinyl chloride and optionally having incorporated therein minor quantities of a copolymerizable monomer such as acrylonitrile, together with 2 to 40 parts by weight of said PVC of an EVA copolymer containing 2 to 65 weight percent vinyl acetate and 3 to 10 parts by weight of said PVC of a chlorinated polyethylene (CPE) containing 35 weight percent chlorine. No mention is made of the use of a SAN copolymer in the aforesaid polymer blends. U.S. Pat. No. 3,322,858 describes multicomponent polymer blends containing vinyl chloride grafted EVA copolymers of up to 50 weight percent EVA copolymer (with the working examples indicating a preference for substantially smaller quantities of EVA copolymer in the graft resin), a CPE resin and a SAN copolymer as a processing aid. U.S. Pat. No. 3,549,727 discloses polymer blends containing E-VA-VOH terpolymer. The use of PVC, CPE and/or SAN copolymer are neither disclosed nor suggested. U.S. Pat. No. 3,644,577 describes polymer blends containing 60 to 95 weight percent PVC and 40 to 5 weight percent of a nitrile copolymer such as SAN copolymer. The blends may also contain as an optional ingredient an impact modifier such as an EVA copolymer. The characteristics of the polymers disclosed in this patent are largely those of PVC reflecting the dominant presence of this resin in the blends. U.S. Pat. No. 3,758,661 is illustrative of a two component blend containing a copolymer of an alpha-olefin and a copolymerizable monomer therewith, e.g., EVA copolymer, and a resin having poor compatibility with the olefinic resin such as SAN copolymer of PVC. U.S. Pat. No. 3,960,986 describes impact-resistant molding compositions containing 20 to 80 percent PVC, 19.5 to 75 weight percent of a vinyl chloride graft copolymer of ethylene and vinyl acetate and 0.5 to 5.0 weight percent EVA copolymer. The incorporation of nitrile-containing copolymer such as SAN copolymer is not mentioned in this patent.

In accordance with U.S. Pat. No. 4,141,936, compatibilized blends of certain EVA copolymers and/or E-VA-VOH terpolymers in SAN copolymer are obtained by blending PVC or CPE as the third component of the blend. The polymer triblends of this patent possess enhanced impact strength and injection moldability without any loss of heat aging resistance. Some compositions of the compatibilized blend type of U.S. Pat. No. 4,141,936, including those especially when the EVA and/or E-VA-VOH component possesses more than about 55 percent by weight of interpolymerized vinyl acetate, however, have a tendency towards instability to sunlight and retain impact strength for only a limited time upon exposure to ultraviolet rays.

SUMMARY OF THE INVENTION

It has now been discovered that stability to ultraviolet degradation can be imparted to compatibilized polymer triblends of high impact strength, and also into similar compositions containing saturated rubber modifiers such as an acrylic rubber when stability is poor, by incorporating titania filler therein.

Thus, in accordance with the present invention, ultraviolet radiation and impact resistant compatibilized polymer blends are provided which comprise (all quantities are given by weight):

(a) a polymer triblend comprising:
  i. from about 5 parts per hundred (pph) to about 40 pph of at least one resin selected from the group consisting of a copolymer of ethylene and vinyl acetate containing from about 25 percent to about 75 percent vinyl acetate and a terpolymer of ethylene, vinyl acetate and the theoretical monomer vinyl alcohol containing from about 20 percent to about 80 percent ethylene, from about 18 percent to about 60 percent vinyl acetate and from about 2 percent to about 20 percent vinyl alcohol;
  ii. from about 50 pph to about 95 pph of a copolymer of styrene and acrylonitrile containing from about 15 percent to about 40 percent acrylonitrile;
  iii. from about 0.1 pph to about 40 pph of a chlorine-containing polymer; and, (b) from about 2 to about 40 pph of titania particulate.

Titania, especially the rutile variety which is the most commonly available form of the oxide, is well known as a protective, whitening pigment in paints and as an outdoor weathering stabilizer for some types of plastics in specific compositions. However, titania not only fails to substantially stabilize ABS copolymers, it seriously reduces the impact strength of such copolymers as ABS when mixed therewith. ABS resins of the general type incorporating unsaturated rubber or elastomers are well known to be protected from degradation in sunlight only when filled with carbon black or when covered with a protective coating. Contrary to expectation, addition of titania to the polymer blends of this invention provide excellent weatherability (in terms of resistance to degradation by solar ultraviolet radiation) without, however, leading to a significant loss in the impact resistance property.

DESCRIPTION OF THE PREFERRED EMBODIMENTS

In the description of the invention which follows and in the claims, all quantities are given by weight except as otherwise specified.

The EVA copolymers which are useful in the preparation of the polymer triblends of this invention are copolymers of ethylene and vinyl acetate in a ratio of about 60:30 to about 25:75, and preferably about 65:35 to about 30:70, by weight. The copolymers are a well known type of resin which can be prepared by any of the known and conventional polymerization techniques. The melt flow rate (MFR) of the useful EVA copolymers can be more than about 50 g per 10 minutes as measured under ASTM D-1238 Condition E, but advantageously is less than about 30 g per 10 minutes. The most preferred EVA copolymers will have an MFR less than about 5 g per 10 minutes. Such low MFRs can be readily obtained by crosslinking the copolymers employing known and conventional crosslinking methods. The EVA copolymer can also contain insoluble gel, preferably in an amount representing about 30 percent to about 90 percent of the copolymer, when superior results are sought for blends containing low levels of PVC. The aforesaid insoluble gel content is also preferred when the vinyl acetate content of the EVA copolymer is less than about 50 percent. Meaningful MFR measurements cannot be obtained for the gel-containing resins but it is estimated that the resins will have an MFR of less than about 0.05 g per 10 minutes. The EVA copolymers herein can also contain one or several monomers copolymerizable with ethylene and vinyl acetate not to exceed about 10 percent of the copolymer. Thus, for example the EVA copolymers of this invention can be prepared to include modifying termonomers such as (meth) acrylate ester, e.g., ethyl acrylate, butyl methacrylate, 2-hydroxy ethyl acrylate, and the like; vinyl esters, e.g., vinyl stearate, vinyl versatate, vinyl benzoate, and the like; vinyl ethers, e.g., ethyl vinyl ether, hexyl vinyl ether, and the like; and, carbon monoxide. As noted above, E-VA-VOH terpolymer can be used in partial or total replacement of the EVA copolymer in the triblends of this invention. The useful E-VA-VOH terpolymers will contain from about 20 percent to about 80 percent ethylene, from about 18 percent to about 60 percent vinyl acetate and from about 2 percent to about 20 percent vinyl alcohol. As is well known, E-VA-VOH terpolymers are obtained by converting the vinyl acetate groups of an EVA copolymer to vinyl alcohol groups employing such techniques as alcoholysis, saponification or hydrolysis. Like the EVA copolymers, supra, the E-VA-VOH terpolymers can contain up to 10 percent of copolymerizable monomer, e.g., any of the monomers which can be copolymerized with ethylene and vinyl acetate, a number of which have been identified herein.

The SAN copolymers which can be utilized in the polymer triblends herein are prepared by copolymerizing styrene and acrylonitrile in a known manner in a ratio of about 85:15 to about 60:40, and preferably about 80:20 to about 65:35 by weight. Up to about 20 percent of the styrene can be replaced with another vinyl aromatic monomer such as an alpha-alkyl styrene, e.g., alpha-methyl styrene and the ring chlorinated analogs thereof; similarly, up to about 20 percent of the acrylonitrile component can be replaced with another nitrile-containing monomer, e.g., methacrylonitrile.

The preferred PVC resins herein are vinyl chloride homopolymers containing at least about 95 percent polymerized vinyl chloride. The PVC can also contain up to 5 weight percent of a copolymerizable monomer such as vinylidene halide; a vinyl ester, e.g., vinyl acetate; acrylic and alpha-alkyl acrylic acids, e.g., acrylic acid and methacrylic acid; an alkyl ester of such an acid, e.g., methyl acrylate, ethyl acrylate, methyl methacrylate; an amide of such an acid, e.g., acrylamide, methacrylamide; unsaturated nitriles, e.g., acrylonitrile, methacrylonitrile, ethacrylonitrile, a vinyl aromatic, e.g., styrene and alpha-alkyl styrenes; dialkyl esters of maleic acid, e.g., dimethyl maleate and the corresponding fumarates; vinyl alkyl ethers and ketones, and various other ethylenically unsaturated compounds copolymerizable with vinyl chloride.

CPE resin can be used in partial or complete replacement of PVC in the polymer triblends of this invention. Chlorinated copolymers of ethylene and minor amounts of other alpha-olefins such as propylene and butene can also be used. The chlorine can be arranged in the CPE resins predominantly in a random or uniform manner along the polymer molecule and must be present therein at a level of from about 25 percent to about 45 percent. The processes for preparing the starting polyethylene or polyethylene alpha-olefin copolymer and the procedures used for chlorinating the same are well known in the art. CPE resins can be advantageously employed when discoloration of the polymer blends is a significant concern since unlike the PVC resins, CPE resins are given to little or no discoloration due to thermal dehydrochlorination reactions.

The amount of the polymer components contained in the triblends herein can vary from about 5 pph to about 40 pph EVA copolymer or E-VA-VOH terpolymer; from about 95 pph to about 50 pph SAN copolymer; from about 0.1 pph to about 40 pph PVC when EVA copolymer is present and from about 5 pph to about 40 pph of this resin when E-VA-VOH terpolymer is present; and, in place of PVC, from about 5 pph to about 40 pph CPE. Preferred ranges are about 10 pph to about 30 pph EVA copolymer, about 80 pph to about 50 pph SAN copolymer and about 1 pph to about 30 pph chlorine-containing polymer.

The titania pigment herein, advantageously of the rutile type, is incorporated into the compatibilized thermoplastic triblends of this invention at a level of from about 2 to about 40 pph, and preferably at a level of from about 4 to about 30 pph. Average particle size of the titania is not critical and can vary over a wide range. Thus, for example, titania having an average particle size of about 0.2 mm or below is entirely suitable.

The blends are prepared by heat plastifying and mechanically working the polymeric ingredients and titania particulate in admixture with one another in the usual way as by blending the polymeric materials on heated rolls, in a Banbury mixer, or in a plastic extruder until a homogeneous and uniform composition is obtained. Temperature in the blending step can vary from about 150° C. to about 210° C. Lower temperatures are ineffective for melt mixing and higher temperatures induce undesirable decomposition and discoloration. It is advantageous to include PVC stabilizers in the triblends to permit thorough mixing without discoloration. Pressure can vary from about 0.1 to about 10 atmospheres or more, but atmospheric pressure is usually suitable. In general, compounding the heat plastified ingredients with one another for periods of from about 0.1 to about 30 minutes, and preferably from about 0.2 to about 15 minutes, provides satisfactory results. Intensive mixing requires less time than low shear mixing but requires greater care to prevent PVC decomposition. Particularly when PVC is employed, blending should not extend beyond the period sufficient to provide acceptable mixing of the polymer ingredients so as to avoid or minimize any resin decomposition. The resinous components of the triblend can be compounded in any order of addition. However, it is usually preferred to first add the chlorine-containing polymer, i.e., PVC or CPE, to the molten SAN copolymer which contains a stabilizer and/or other adjuvant and thereafter add the EVA copolymer or E-VA-VOH terpolymer.

Known and conventional molding aids can be incorporated into the polymer triblends as desired. Accordingly, the blends can be prepared to include stabilizers in amounts up to about 5 pph, preferably from about 0.5 pph to about 3 pph; lubricants in amounts up to about 4 pph, preferably from about 0.1 pph to about 3 pph; chelating agents and antioxidants in amounts up to about 2 pph, preferably from about 0.1 pph to about 1.5 pph; pigments and dyes in amounts up to about 5 pph, preferably from about 1 pph to about 4 pph; fillers in amounts up to 10 pph; and, processing aids in amounts up to about 5 pph, preferably from 1 pph to about 4 pph.

The following examples are illustrative of the polymer triblends of this invention (except Example 2 which demonstrates the deleterious effect of titania on the impact strength of ABS) and the manner in which they are prepared. Where melt flow rates are given, these are according to ASTM Method D-2138 and are reported in g per 10 minutes under Condition E unless otherwise specified. EVA gel contents were determined as percent of a 0.2–0.3 g sample insoluble in a suitable solvent for the EVA after 24 hours suspension in the stirred solvent.

Izod impact strengths, reported in ft. lb. per in., notch were determined according to ASTM Method D-256 except that 1/12 inch rather than ⅛ inch thick specimens were used. Gardner impact strengths, given in in. lb. per mil., were determined using the Gardner Laboratory 1120-M Variable Height Impact Tester on 1¾ by ⅛ inch discs at a 50 percent failure level. Impact tests were at 73° F. unless otherwise noted. Other tests whose results are set forth herein were carried out according to the pertinent ASTM methods.

EXAMPLE 1

65 parts of Dow Chemical Company TYRIL-867 SAN resin, 20 parts of U.S. Industrial Chemicals Company VYNATHENE EVA having 59.7 percent vinyl acetate content and MFR 1.04 g/10 min under Condition B of ASTM D-1238 and 15 parts of B. F. Goodrich Company GEON-103EP PVC resin together with 0.6 part R. T. Vanderbilt Company AGERITE-D antioxidant plus 1.5 parts and 0.55 part, respectively, of Argus Company MARK-235 and MARK-C PVC stabilizers were blended together in accordance with procedures described in U.S. Pat. No. 4,141,936 which is incorporated by reference herein.

Suitable portions of the resulting triblend composition (Triblend A) were modified by melt blending in a C. W. Brabender Plastograph roller blade equipped mixer with NL Industries, Inc., TITANOX-2101 rutile titania powder at levels of 4, 8 and 30 pph on total resin. Izod notched impact values at 73° F. according to ASTM D-256 were 7.8, 8.0 and 2.3 respectively for the titania modified blends versus 7.9 ft. lb/in for the unmodified blend. In addition, one batch was modified with 8 pph of NL Industries, Inc., TITANOX-RA rutile titania and had Izod impact value 9.6 ft.lb/in. All samples for these tests were compression molded.

Comparison of the titania modified and unmodified samples were made by exposing 3"×6"×1/12" compression molded plates in an Atlas Model 600/X W-WR xenon Weather-Ometer with a wet cycle for 18 of each 120 minutes. Results are summarized in Table I below.

TABLE I

Titania Stabilizations of Triblend A
(Original Izod 7.9 ft.lb/in)

| Titania, pph | Percent of Original Izod at Hours Exposure | | | | |
|---|---|---|---|---|---|
| | 0 | 400 | 800 | 1200 | 1600 |
| 0 | 100 | 11 | 2 | — | — |
| 4 | 99 | 94 | 33 | 40 | — |
| 8 | 101 | 101 | 46 | 45 | — |
| 8* | 121 | 54 | 53 | 34 | 33 |
| 30 | 29 | — | 33 | 16 | — |

*TITANOX-RA; all others are TITANOX-2101.

From these data, it is evident that titania addition considerably improved the stability of Triblend A, particularly at 4 and 8 pph of TITANOX-2101 and at 400 hours in the Xenotest. In addition, impact strength before exposure was either improved or essentially unchanged by titania addition at the 4–8 pph level. And, although impact strength was initially lowered by incorporation of 30 pph titania at 0 hours exposure, retained impact strength at 800 and at 1200 hour was considerably improved over that for unmodified triblend.

EXAMPLE 2

By way of demonstrating the impact-reducing effect of titania on ABS resin, 8 pph of TITANOX-2101 were melt blended into Borg Warner Company CYCOLAC-T, a well established commercial product. The titania modified composition had Izod impact only 1.6 ft.lb/in versus a value of 4.9 for the original ABS. Comparison of these materials in the Weather-Ometer Xenotest described in Example 1 gave the results set forth in Table II below:

TABLE II

Titania Effects in ABS
(Original Izod 4.9 ft.lb/in)

| Titania, pph | Percent of Original Izod at Hours Exposure | | | |
|---|---|---|---|---|
| | 0 | 400 | 800 | 1200 |
| 0 | 100 | 49 | 47 | 47 |
| 8 | 33 | 27 | 22 | 18 |

It is evident that titania addition had a deleterious effect on the strength of the ABS which, as is well known in the art, "stabilizes" at about 50 percent Izod loss in such tests after a very rapid initial deterioration.

EXAMPLE 3

A triblend designated "Triblend B" was prepared in similar fashion to Triblend A of Example 1, except that the VYNATHENE EVA had 61.0 percent vinyl acetate content and MFR 0.28 g/10 min with mixing being accomplished on a commercial scale in a Banbury mixer. In a similar fashion two equivalent blends were made to which were added 8 pph and 12 pph of TITA-NOX -2101 respectively. Samples of these three compositions were injection molded into 6 inch diameter×1/12 inch thick circles. Izod strength for bars cut from these circles were 14.9 (unmodified), 16.1 (8 pph titania) and 10.6 (12 pph titania) ft.lb/in.

Results of Weather-Ometer Xenotests on these injection molded compositions are summarized below in Table III:

TABLE III

| Titania, pph | Titania Stabilization of Triblend B (Original Izod 14.9 ft.lb/in) | | | | |
|---|---|---|---|---|---|
| | Percent of Original Izod at Hours Exposure | | | | |
| | 0 | 400 | 800 | 1200 | 1600 |
| 0 | 100 | 89 | 3 | 2 | 3 |
| 8 | 108 | 116 | 107 | — | 22 |
| 12 | 71 | 79 | 22 | 17 | 17 |

These data demonstrate that titania has a substantial stabilizing effect on the triblend, particularly notable at 800–1600 hours exposure.

What is claimed is:

1. Compatibilized polymer triblends which comprise:
   a. from about 5 to about 40 pph of at least one resin selected from the group consisting of:
      i. a copolymer of ethylene and vinyl acetate containing from about 25 percent to about 75 percent vinyl acetate, and
      ii. a terpolymer of ethylene, vinyl acetate and the theoretical monomer vinyl alcohol containing from about 20 percent to about 80 percent ethylene, from about 18 percent to about 60 percent vinyl acetate and from about 2 percent to about 20 percent vinyl alcohol;
   b. from about 50 pph to about 95 pph of a copolymer of styrene and acrylonitrile containing from about 15 percent to about 40 percent acrylonitrile;
   c. from about 0.1 pph to about 40 pph of a chlorinated polyethylene; and,
   d. from about 2 to about 40 pph titania particulate, said titania particulate imparting to said triblend resistance to degradation by solar ultraviolet radiation but without significant loss in impact resistance when compared with the impact resistance of said triblend to which no titania particulate has been added.

2. The polymer triblends of claim 1 wherein copolymer (i) is a copolymer of ethylene and vinyl acetate in which the ratio of ethylene to vinyl acetate is from about 65:35 to about 30:70.

3. The polymer triblends of claim 1 wherein copolymer (i) is a copolymer of ethylene and vinyl acetate in which the melt flow rate of the copolymer is less than about 30 g per 10 minutes as measured under ASTM D-1238 Condition E.

4. The polymer triblends of claim 3 wherein the melt flow rate of the copolymer (i) is less than about 5 g per 10 minutes as measured under ASTM D-1238 Condition E.

5. The polymer triblends of claim 1 wherein copolymer (i) is a copolymer of ethylene and vinyl acetate containing at least one additional monomer copolymerizable with ethylene and vinyl acetate, said additional monomer not exceeding about 5 percent of the copolymer.

6. The polymer triblends of claim 5 wherein copolymer (i) is a terpolymer of ethylene, vinyl acetate and vinyl alcohol obtained by the partial alcoholysis, saponification or hydrolysis of a copolymer of ethylene and vinyl acetate containing from about 25 percent to about 75 percent vinyl acetate.

7. The polymer triblends of claim 1 wherein copolymer (ii) contains a ratio of styrene to acrylonitrile of from about 80:20 to about 65:35.

8. The polymer triblends of claim 1 wherein copolymer (ii) contains up to about 20 percent of another vinyl aromatic monomer in partial replacement of styrene.

9. The polymer triblends of claim 1 wherein copolymer (ii) contains up to about 20 percent of another nitrile-containing monomer in partial replacement of acrylonitrile.

10. The polymer triblends of claim 1 containing from about 10 pph to about 30 pph EVA copolymer, from about 80 to about 50 pph SAN copolymer and from about 1 pph to about 30 pph chlorinated polyethylene.

11. The polymer triblends of claim 1 wherein the titania is rutile titania.

12. The polymer triblends of claim 1 wherein titania is present at a level of from about 4 to about 30 pph.

13. Compatibilized polymer triblends which comprise:
   a. from about 5 to about 40 pph of at least one resin selected from the group consisting of:
      i. a copolymer of ethylene and vinyl acetate containing from about 25 percent to about 75 percent vinyl acetate, and
      ii. a terpolymer of ethylene, vinyl acetate and the theoretical monomer vinyl alcohol containing from about 20 percent to about 80 percent ethylene, from about 18 percent to about 60 percent vinyl acetate and from about 2 percent to about 20 percent vinyl alcohol;
   b. from about 50 pph to about 95 pph of a copolymer of styrene and acrylonitrile containing from about 15 percent to about 40 percent acrylonitrile;
   c. from about 0.1 pph to about 40 pph of a polyvinyl chloride; and,
   d. from about 2 to about 40 pph titania particulate, said titania particulate imparting to said triblend resistance to degradation by solar ultraviolet radiation but without significant loss in impact resistance when compared with the impact resistance of said triblend to which no titania particulate has been added.

14. The polymer triblends of claim 13 wherein copolymer (i) is a copolymer of ethylene and vinyl acetate in which the ratio of ethylene to vinyl acetate is from about 65:35 to about 30:70.

15. The polymer triblends of claim 13 wherein copolymer (i) is a copolymer of ethylene and vinyl acetate in which the melt flow rate of the copolymer is less than about 30 g per 10 minutes as measured under ASTM D-1238 Condition E.

16. The polymer triblends of claim 15 wherein the melt flow rate of copolymer (i) is less than about 5 g per 10 minutes as measured under ASTM D-1238 Condition E.

17. The polymer triblends of claim 13 wherein copolymer (i) is a copolymer of ethylene and vinyl acetate containing at least one additional monomer copolymerizable with ethylene and vinyl acetate, said additional monomer not exceeding about 5 percent of the copolymer.

18. The polymer triblends of claim 17 wherein copolymer (i) is a terpolymer of ethylene, vinyl acetate and vinyl alcohol obtained by the partial alcoholysis, saponification or hydrolysis of a copolymer.

19. The polymer triblends of claim 13 wherein copolymer (ii) contains a ratio of styrene to acrylonitrile of from about 80:20 to about 65:35.

20. The polymer triblends of claim 13 wherein copolymer (ii) contains up to about 20 percent of another vinyl aromatic in partial replacement of styrene.

21. The polymer triblends of claim 13 wherein copolymer (ii) contains up to about 20 percent of another nitrile-containing monomer in partial replacement of acrylonitrile.

22. The polymer triblends of claim 13 wherein polyvinyl chloride (iii) contains at least about 92 percent polymerized vinyl chloride.

23. The polymer triblends of claim 22 wherein polyvinyl chloride (iii) contains at least one additional monomer copolymerizable with vinyl chloride, said additional monomer not exceeding about 5 percent of the polyvinyl chloride.

24. The polymer triblends of claim 13 containing from about 10 pph to about 30 pph EVA copolymer, from about 80 to about 50 pph SAN copolymer and about 1 pph to about 30 pph of a polyvinyl chloride containing at least about 95 percent polymerized vinyl chloride.

25. The polymer triblends of claim 13 wherein the titania is rutile titania.

26. The polymer triblends of claim 13 wherein titania is present at a level of from about 4 to about 30 pph.

* * * * *